United States Patent
Underhill

(10) Patent No.: US 12,095,305 B2
(45) Date of Patent: Sep. 17, 2024

(54) AC AND DC CHARGING VIA A SINGLE COUPLER

(71) Applicant: Rivian IP Holdings, LLC, Plymouth, MI (US)

(72) Inventor: Kyle Underhill, Los Angeles, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 43 days.

(21) Appl. No.: 17/564,845

(22) Filed: Dec. 29, 2021

(65) Prior Publication Data

US 2023/0208183 A1    Jun. 29, 2023

(51) Int. Cl.
*H02J 7/00*        (2006.01)
*H02J 7/02*        (2016.01)
*H02J 9/06*        (2006.01)

(52) U.S. Cl.
CPC .............. *H02J 9/06* (2013.01); *H02J 7/0069* (2020.01); *H02J 7/02* (2013.01); *H02J 7/0013* (2013.01)

(58) Field of Classification Search
CPC .......... B60L 53/14; B60L 53/20; B60L 53/50; B60L 53/57; B60L 55/00; B60L 53/12; H01R 13/665; H01R 13/6683; H02J 3/14; H02J 3/38; H02J 3/388; H02J 4/00; H02J 7/0042; H02J 2310/64; H02J 3/00; H02J 3/381; H02J 2310/14; H02J 3/385; H02J 3/46; H02J 7/04; H02J 7/35; H02J 13/00007; H02J 13/0002; H02J 13/0062; H02J 13/0075; Y02E 60/00; Y02T 10/70; Y02T 10/7072; Y02T 90/12; Y02T 90/14; Y02T 90/16; Y02T 10/92; Y04S 10/126; Y04S 20/222; Y04S 40/12; Y04S 40/126; Y02B 70/3225; Y02B 90/20; H02H 9/02
USPC .......................................................... 307/23
See application file for complete search history.

(56) References Cited

U.S. PATENT DOCUMENTS

| | | | |
|---|---|---|---|
| 2020/0290474 A1* | 9/2020 | Cashdollar | B60L 53/62 |
| 2021/0086646 A1* | 3/2021 | Prasad | B60L 53/18 |
| 2021/0138874 A1* | 5/2021 | Srnec | B60P 3/20 |
| 2021/0354575 A1* | 11/2021 | Vahedi | H02J 7/0032 |
| 2022/0169131 A1* | 6/2022 | Galin | B60L 53/20 |

* cited by examiner

*Primary Examiner* — Rexford N Barnie
*Assistant Examiner* — Xuan Ly
(74) *Attorney, Agent, or Firm* — Foley & Lardner LLP

(57) ABSTRACT

Disclosed embodiments include apparatuses, systems, and methods to provide both AC and DC power for charging battery systems. In an illustrative embodiment, an apparatus includes a coupler receivable by a power input of a rechargeable battery system, where the coupler includes: alternating current (AC) terminals configured to electrically engage AC input terminals of the power input and direct current (DC) terminals configured to electrically engage DC input terminals of the power input; a cable that includes a plurality of sets of conductors including a set of AC conductors coupled to the AC terminals and a set of DC conductors coupled to the DC terminals, wherein the set of AC conductors is configured to be selectively coupled to an AC power source and the set of DC conductors is configured to be selectively coupled to a DC power source.

20 Claims, 14 Drawing Sheets

AC AND DC CHARGING VIA A SINGLE COUPLER

INTRODUCTION

The battery systems of electrically-powered vehicles may be charged with either alternating current (AC) power or direct current (DC) power. Generally speaking, DC power provides for faster charging, although it may be desirable to precondition a depleted battery system by providing AC power to the battery system before providing DC power for fast charging. When seeking to charge battery systems of multiple vehicles, switching charging cables to provide AC power and then DC power to the individual battery systems may be cumbersome. Also, because electric utilities provide AC power, which must be converted to DC power to provide DC power for charging, DC power may not be available to simultaneously charge the battery systems of multiple vehicles.

The statements in this section merely provide background information related to the present disclosure and may not constitute prior art.

SUMMARY

Disclosed embodiments include apparatuses, systems, and methods to provide both AC and DC power for charging battery systems.

In an illustrative embodiment, an apparatus includes a coupler receivable by a power input of a rechargeable battery system, where the coupler includes: alternating current (AC) terminals configured to electrically engage AC input terminals of the power input and direct current (DC) terminals configured to electrically engage DC input terminals of the power input; a cable that includes a plurality of sets of conductors including a set of AC conductors coupled to the AC terminals and a set of DC conductors coupled to the DC terminals, wherein the set of AC conductors is configured to be selectively coupled to an AC power source and the set of DC conductors is configured to be selectively coupled to a DC power source.

In another illustrative embodiment, a system includes one or more power dispensers, where each of the power dispensers includes: an alternating current (AC) power dispenser electrically couplable to an AC power source and configured to selectively couple the AC power source to a rechargeable battery system; a direct current (DC) power dispenser electrically couplable to a DC power source and configured to selectively couple the DC power source to the rechargeable battery system; and a coupler receivable by a power input electrically coupled to the rechargeable battery system, wherein the coupler includes: AC terminals configured to electrically engage AC input terminals of the power input; DC terminals configured to electrically engage DC input terminals of the power input; and a cable that includes a plurality of sets of conductors including a set of AC conductors coupled to the AC terminals and a set of DC conductors coupled to the DC terminals, wherein the set of AC conductors is configured to be selectively coupled to an AC power source and the set of DC conductors is configured to be selectively coupled to a DC power source.

In another illustrative embodiment, an illustrative method includes: connecting a coupler of a power dispenser to a power input of a rechargeable battery system, the coupler including alternating current (AC) terminals coupled to a set of AC conductors and direct current (DC) terminals coupled to a set of DC conductors; and selectively coupling a power source to at least one of the sets of conductors, the coupling chosen from coupling the AC power source to the set of AC conductors and coupling the DC power source to the set of DC conductors.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION

Figure 1:
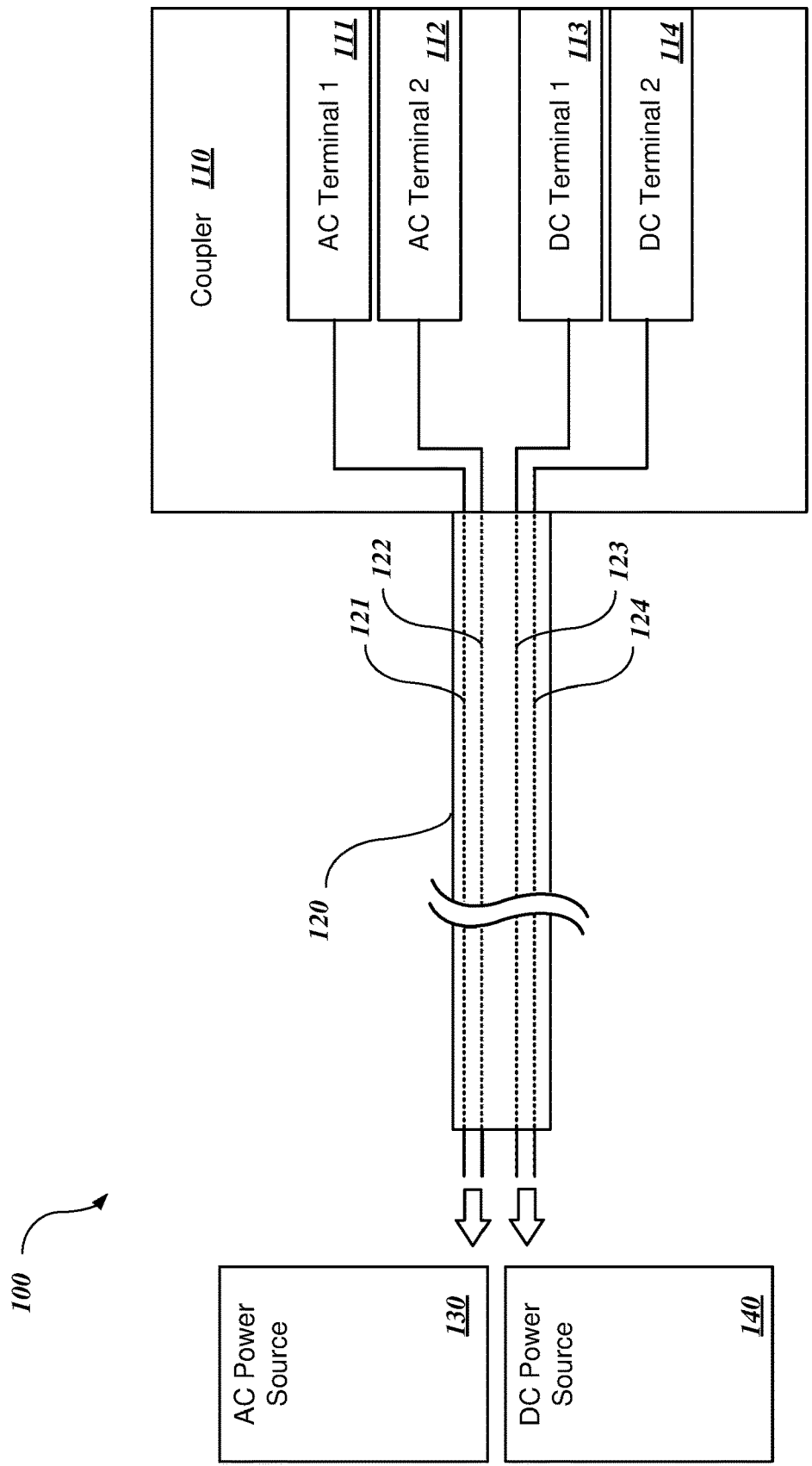
FIG. 1 is a schematic diagram in partial cutaway form of a coupler and a cable including a set of alternating current (AC) conductors and a set of direct current (DC) conductors that are connectable to AC and DC power sources.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

By way of a non-limiting introduction and overview, various disclosed embodiments include apparatuses, systems, and methods to provide both AC and DC power for charging battery systems. In various embodiments, an illustrative apparatus includes a coupler receivable by a power input of a rechargeable battery system, where the coupler includes: alternating current (AC) terminals configured to electrically engage AC input terminals of the power input and direct current (DC) terminals configured to electrically engage DC input terminals of the power input; and a cable that includes a plurality of sets of conductors including a set of AC conductors coupled to the AC terminals and couplable to an AC power source and a set of DC conductors coupled to the DC terminals and couplable to a DC power source, enabling the AC power source and the DC power source to be selectively coupled to the rechargeable battery system via the coupler. Thus, in various embodiments, AC and DC power may be selectively providable to charge the battery system via a single coupler and cable. In various embodiments, an illustrative system using an embodiment of the coupler and cable can include at least one power dispenser (and, in some embodiments, may include more than one power dispenser, if desired).

In some such embodiments, each of the power dispensers may include: an AC power dispenser electrically couplable to an AC power source and a DC power dispenser electrically couplable to a DC power source. The AC power dispenser is configured to selectively couple the AC power source to a rechargeable battery system and the DC power dispenser is configured to selectively couple the DC power source to the rechargeable battery system. Using the coupler and cable previously described, AC and DC power may be conveyed from the AC and DC power dispensers to recharge the battery system using AC or DC power via the coupler.

Now that a general overview has been given, details of various embodiments will be explained by way of non-limiting examples given by way of illustration only and not of limitation.

Referring to FIG. 1, an illustrative apparatus 100 includes a coupler 110 joined with conductors 121-124 of a cable 120. The coupler 110 includes both AC terminals 111 and 112 that are configured to electrically engage AC input terminals of a power input (not shown in FIG. 1) and DC terminals 113 and 114 that are configured to electrically engage DC input terminals of the power input (not shown in FIG. 1). The AC terminals 111 and 112 are joined with a set of conductors 121 and 122 of the cable 120 that are couplable to an AC power source 130. The DC terminals 113 and 114 are joined with a set of conductors 123 and 124 of the cable 120 that are couplable to a DC power source 140. Thus, using the coupler 110 and cable 120, AC or DC power may be conveyed to a battery system.

Figure 2:
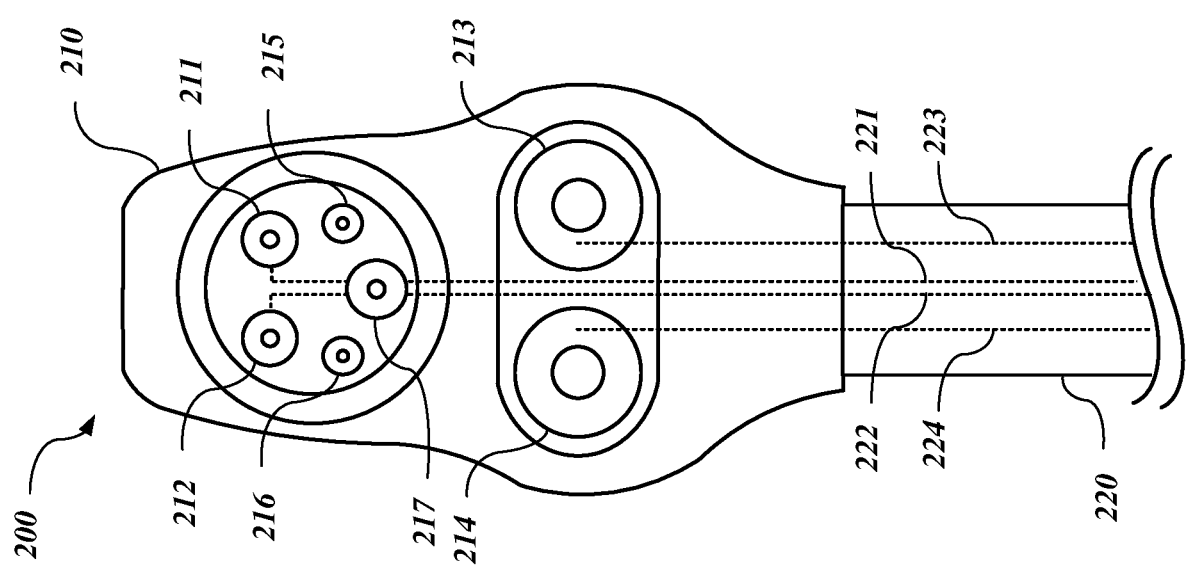
FIG. 2 is a front view of an illustrative coupler.

In various embodiments, the coupler 110 may include a proprietary coupling configured to engage a proprietary input coupling or any standardized coupling. Referring to FIG. 2, for example, in various embodiments, the coupler may include a Combined Charging System (CCS) coupler 200. The CCS coupler 200 includes a body 201 that supports a number of individual connectors 211-217 that present terminals for conductors, such as conductors 221-225 included within a cable 220. The CCS coupler 200 includes AC connectors 211 and 212 and DC connectors 213 and 214, as well as signal line connectors 215 and 216 and a ground connector 217. Although the CCS coupler 200 includes AC connectors 211 and 212 and DC connectors 213 and 214, in practice, only the AC connectors 211 and 212 or DC connectors 213 and 214 are actually coupled with power conductors. In various embodiments, in the coupler 200, the AC connectors 211 and 212 are coupled to a set of AC conductors 221 and 222 and the DC connectors 213 and 214 are coupled to a set of DC conductors 223 and 224. As further described below, with the AC connectors 211 and 212 or DC connectors 213 and 214 coupled to the set of AC conductors 221 and 222 and the set of DC conductors 223 and 224, respectively, both AC and DC power sources (not shown in FIG. 2) may selectively provide power via the coupler 200 to a connected device, such as a battery system of an electrically-powered vehicle.

Figure 3:
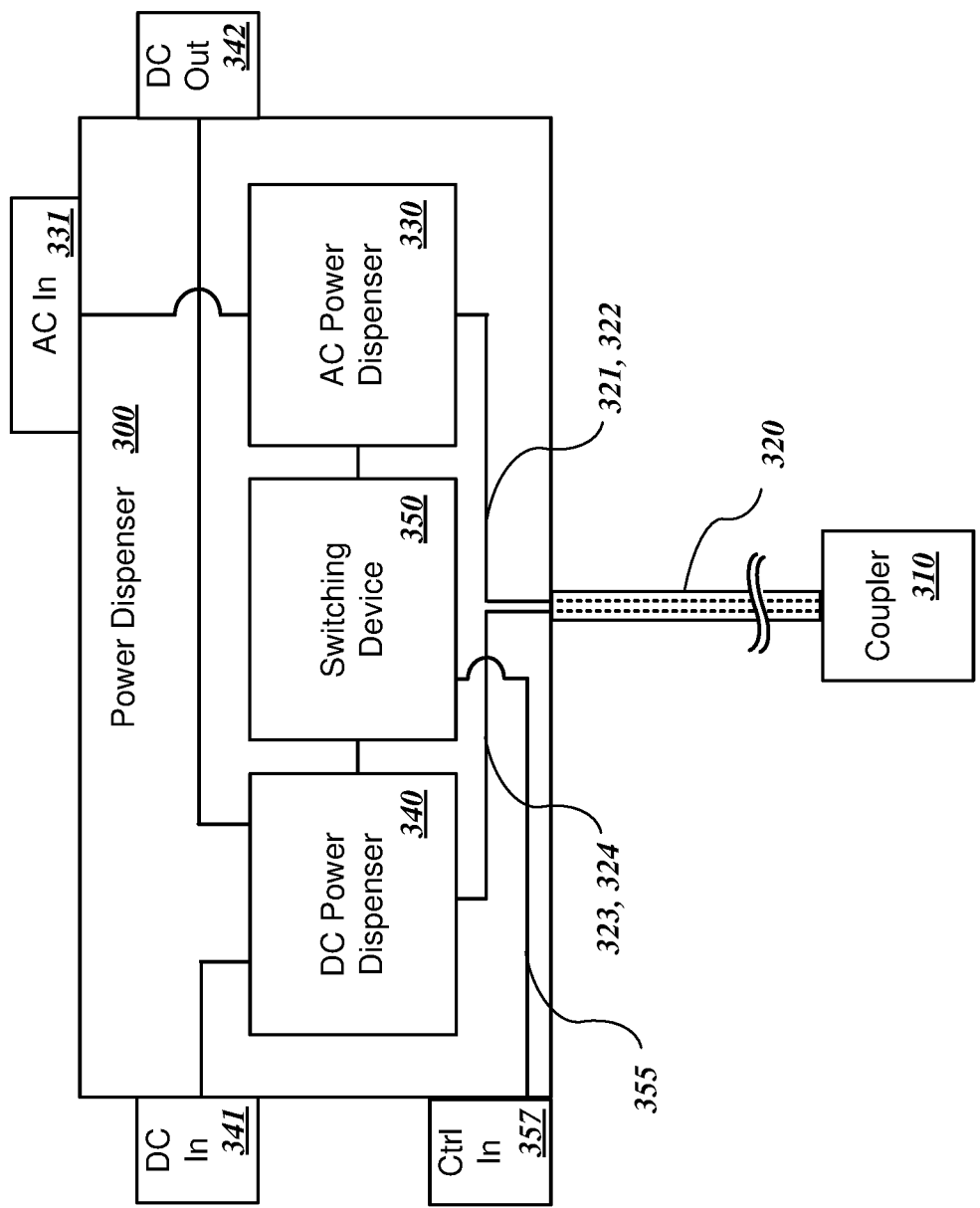
FIGS. 3 and 4 are block diagrams of an illustrative power dispenser usable to provide AC and DC power.

In various embodiments, power sources may be coupled with the cables 120 (FIG. 1) or 220 (FIG. 2) via a power dispenser to selectively provide AC or DC power to a connected device, such as a battery system of an electrically-powered vehicle. Referring to FIG. 3, in various embodiments, a power dispenser 300 includes an AC power dispenser 330 and a DC power dispenser 340. In various embodiments, the AC power dispenser 330 is coupled to an AC input 331 that is couplable with an AC power source (not shown in FIG. 3), as described below. The AC power dispenser 330 is electrically coupled to the set of AC conductors 321 and 322 of a cable 320 that is joined to AC terminals (not shown in FIG. 3) of a coupler 310 that is connectable to a connected device (not shown in FIG. 3), as further described below. In various embodiments, the AC power dispenser 330 is switchably, electrically coupled to the set of AC conductors 321 and 322 to control when AC power provided by the AC power dispenser 330 is provided to the coupler 310 to supply the AC power to a connected device.

In various embodiments, the DC power dispenser 340 is coupled to a DC input 341 that is couplable with a DC power source (not shown in FIG. 3), as described below. The DC power dispenser 340 is coupled to the set of DC conductors 323 and 324 of a cable 320 that is joined to AC terminals (not shown in FIG. 3) of a coupler 310 that is connectable to the connected device (not shown in FIG. 3), as further described below. In various embodiments, the DC power dispenser 340 is switchably electrically coupled to the set of DC conductors 323 and 324 to control when DC power provided by the DC power dispenser 340 is provided to the coupler 310 to supply the DC power to a connected device. In addition, in various embodiments the DC power dispenser 340 may be switchably coupled to a DC output 342 to provide DC power to an external device, such as an additional power dispenser (not shown in FIG. 3) in a "daisy-chain" configuration, if desired and as further described below with reference to FIGS. 5-11.

In various embodiments, the power dispenser 300 includes a switching device 350. In various embodiments, the switching device 350 controls operation of the AC power dispenser 330 and the DC power dispenser 340 by controlling which, if either, of the power dispensers 330 and 340 is switchably coupled to the set of conductors 321-324 of the cable 320 to provide power to the external device via the coupler 310. The switching device 350 may be responsive to a control input 357 that receives a control signal to direct the provision of power by the power dispenser 300 to the coupler 310.

Figure 4:
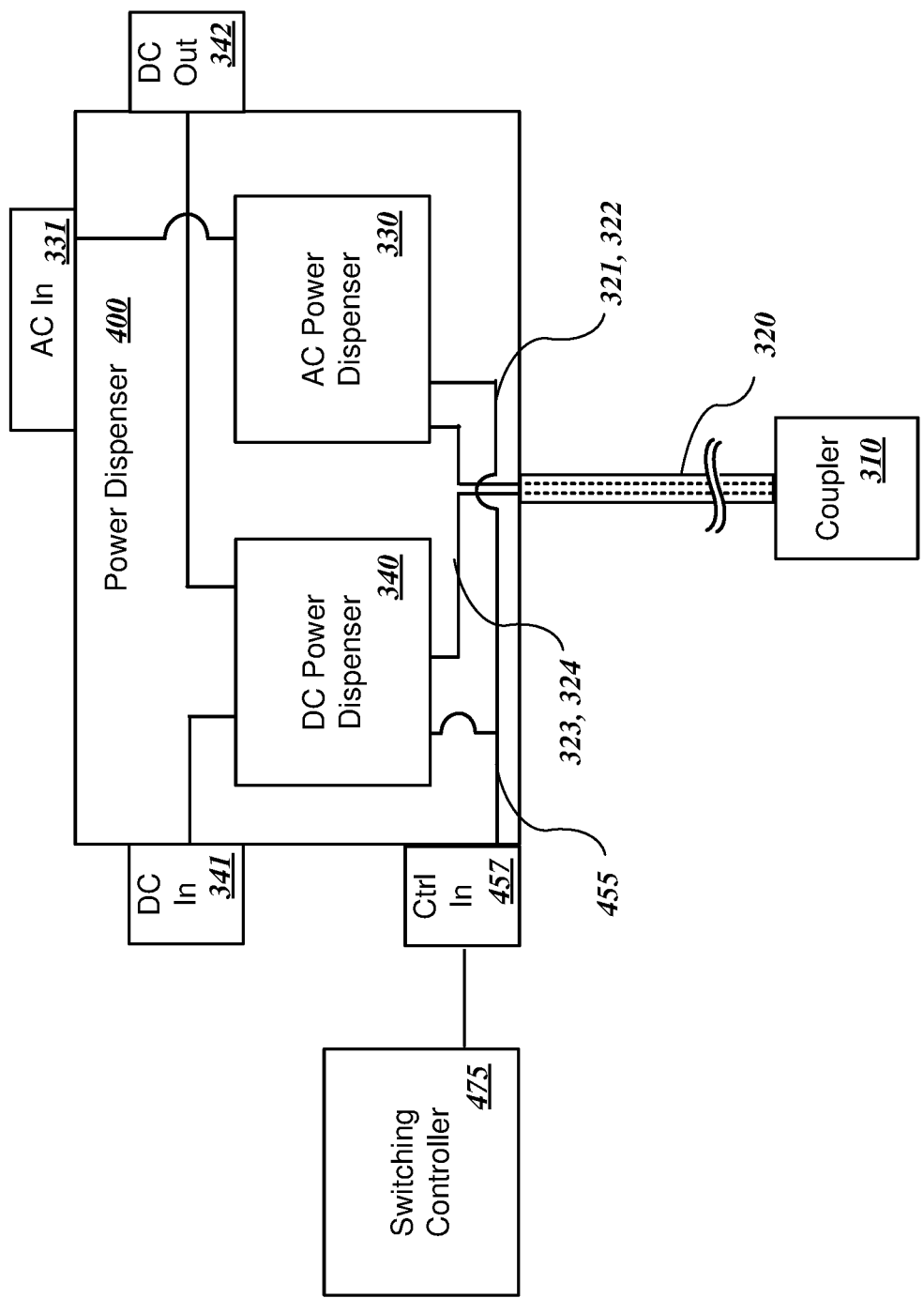

Referring additionally to FIG. 4, in various embodiments, a power dispenser 400 includes the AC power dispenser 330 and the DC power dispenser 340, which are electrically couplable to the cable 320 and coupler, as previously described with reference to FIG. 3. In various embodiments, the power dispenser 400 does not include the switching device 350 (FIG. 3) but is controlled by an external switching controller 475. Control signals from the switching controller 475 are received by a control input 457 which conveys the control signals via control lines 455 electrically coupled to both the AC power dispenser 330 and the AC power dispenser 340 to control which, if either, of the power dispensers 330 and 340 provides electrical power to the coupler 310.

In various embodiments, the AC power dispenser 330 may be configured for charging electrically-powered vehicles from standard, utility-provided AC power. An AC charger may fully charge a battery system of an electrically-powered vehicle over a period of several hours. Depending on the capacity of the battery system, for example, the AC charger may fully or largely charge a battery system over a period ranging between 12 and 40 hours.

As further described below, an AC charger also may be used to precondition a battery system for rapid charging using DC current. In various embodiments, for example, the DC power dispenser 340 is configured to provide 32 to 200 amps of electric power that may charge a battery much more rapidly. In various embodiments, for example, DC rapid charging may fully or largely charge a battery system over a period ranging from 30 minutes to a few hours. It will be appreciated, however, that in some situations, thermal effects of rapid charging may affect the charging capacity of a battery system, thus, preconditioning of the battery system with slower charging may help to maintain the charging capacity of the battery system.

It will also be appreciated that providing high-amperage DC power may require a relatively large and costly converter and may consume a significant amount of AC current. Accordingly, it may be desirable to share such a source of DC power between a number of vehicles, although it will be appreciated that manually switching a connection between the source of DC power and multiple vehicles may require significant manual intervention. It will be appreciated that the couplers 100 (FIG. 1) and 200 (FIG. 2) may provide sources of both AC power and DC power to a battery system without manually switching couplers between the power sources and the battery system. It will also be appreciated, as further described below, that a system operable to selectively provide AC or DC power to each of a number of battery systems enables preconditioning of the battery systems and sharing a source of DC power among the battery systems without manually switching couplers between the power sources and the battery systems.

Figure 5:
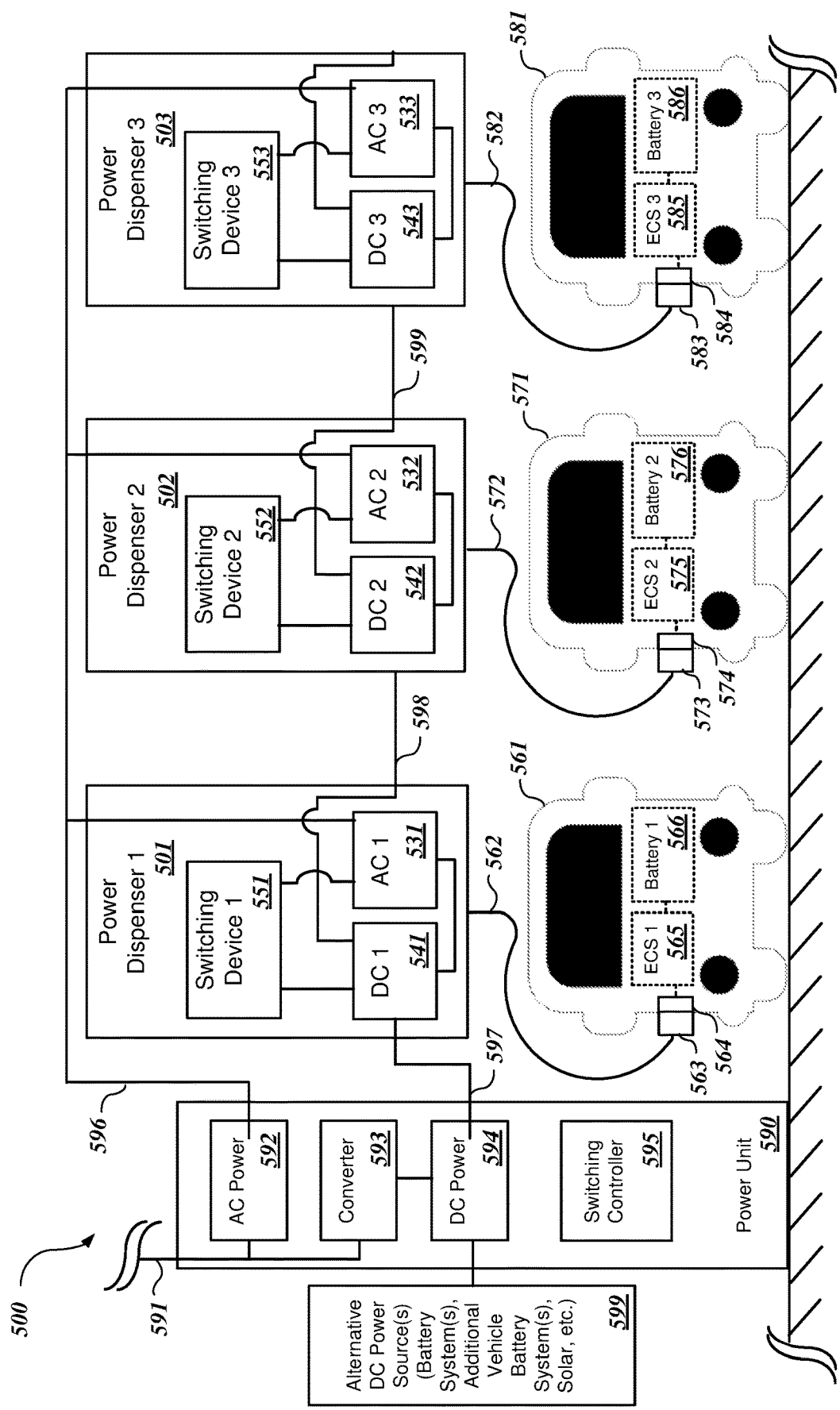
FIGS. 5-11 are schematic diagrams of a group of interconnected power dispensers usable to provide AC and DC power to electric charging systems of a number of vehicles.

Referring additionally to FIG. 5, in various embodiments the power dispensers 300 (FIG. 3) or 400 (FIG. 4) are usable in a charging facility 500 to charge or recharge a number of electrically-powered vehicles 561, 571, and 582. One or more power dispensers 300 or 400 may be used. Each of the vehicles 561, 571, and 582 includes an electronic charging system 565, 575, and 585 having a power input 564, 574, and 575 used to charge a battery system 566, 576, and 586, respectively. Each of the power inputs 564, 574, and 584 is configured to receive a coupler 563, 573, and 583 of a cable 562, 572, and 582 coupled with a power dispenser 501, 502, and 503, respectively. In various embodiments, each of the power dispensers 501, 502, and 503 includes an AC power dispenser 531, 532, and 542 and a DC power dispenser 541, 542, and 543, respectively.

In various embodiments, each of the power dispensers 501, 502, and 503 also includes a switching device 551, 552, and 553 as described with reference to FIG. 3 that selectively controls whether the AC power dispenser 531, 532, and 542 or the DC power dispenser 541, 542, and 543 direct power to the couplings 563, 573, and 583 via the cables 562, 572, and 582, respectively. In various embodiments, the switching devices 551, 552, and 553 operate under direction of a switching controller 595, as further described below. In various embodiments, as described with reference to FIG. 4, instead of each of the power dispensers 501, 502, and 503 including a switching device 551, 552, and 553, the switching controller 595 directly controls whether the AC power dispenser 531, 532, and 542 or the DC power dispenser 541, 542, and 543 direct power to the couplings 563, 573, and 583 via the cables 562, 572, and 582, respectively via a control line (not shown in FIG. 5) or a wireless control signal (not shown).

In various embodiments, a power unit 590 also includes an AC power source 592 that receives an AC power line 591. In various embodiments, the power unit 590 includes a converter 593 that also receives AC power via the AC power line 591 and converts the AC power to DC power that is providable to the DC power source 594. In various embodiments, instead of and/or in addition to the DC power source 594 receiving DC power from the converter 593, the DC power source 594 also may receive power from one or more alternative DC power sources 599 couplable to the DC power source 594. The alternative DC power sources 599, in various embodiments, may include one or more battery systems, including one or more standalone battery systems or the battery system of one or more other vehicles. In various embodiments, the alternative DC power sources also may include solar cells or any other source of DC power. It will be appreciated that the alternative DC power source 599 also may be incorporated into the embodiments of FIGS. 6-10 (or any other embodiments) even though he alternative DC power source 599 is not expressly shown in FIGS. 6-10. In various embodiments, the AC power source 592 is coupled to the AC power dispenser 531, 532, and 533 of each of the power dispensers 501, 502, and 503, respectively, via an AC power bus 596.

By contrast, in various embodiments, the DC power source 594 may be coupled to the DC power dispensers 541, 542, and 543 of the power dispensers 501, 502, and 503, respectively, in a daisy-chain arrangement. In various embodiments, the DC power source 594 is coupled to a DC power input (not specifically shown in FIG. 5) of DC power dispenser 1 541 of power dispenser 1 501 via a first DC power line 597. In turn, a DC output (not specifically shown in FIG. 5) of DC power dispenser 1 541 is coupled to a DC power input (not specifically shown) of DC power dispenser 2 542 of power dispenser 2 502 via a second DC power line 598. Further in turn, a DC output (not specifically shown in FIG. 5) of DC power dispenser 2 542 is coupled to a DC power input (not specifically shown) of DC power dispenser 3 543 of power dispenser 3 503 via a third DC power line 599.

In this arrangement, AC power is selectively providable to each of the electronic charging systems 565, 575, and 585 of the vehicles 561, 571, and 581, respectively. AC power from the AC power source 592 may be provided simultaneously to more than one of the electronic charging systems 565, 575, and 585 of the vehicles 561, 571, and 581, respectively, or to all of the electronic charging systems 565, 575, and 585 simultaneously. DC power from the DC power source 594 may be selectively provided to one (or none) of the DC power dispensers 541, 542, or 543. Because the DC power dispensers 541, 542, and 543 are connected in a daisy chain arrangement, one of the DC power dispensers 541, 542, and 543 will receive the DC power from the DC power source 594 at one time so that the DC power can be singularly directed to one of the electronic charging systems 565, 575, and 585 for fast charging of the battery systems 566, 576, and 586, respectively. The switching controller 595 and/or the switching devices 551, 552, and 553 may be used to control which of the DC power dispensers 541, 542, and 543 receives the DC power and/or in what sequence the DC power is provided to the DC power dispensers 541, 542, and 543.

Figure 6:
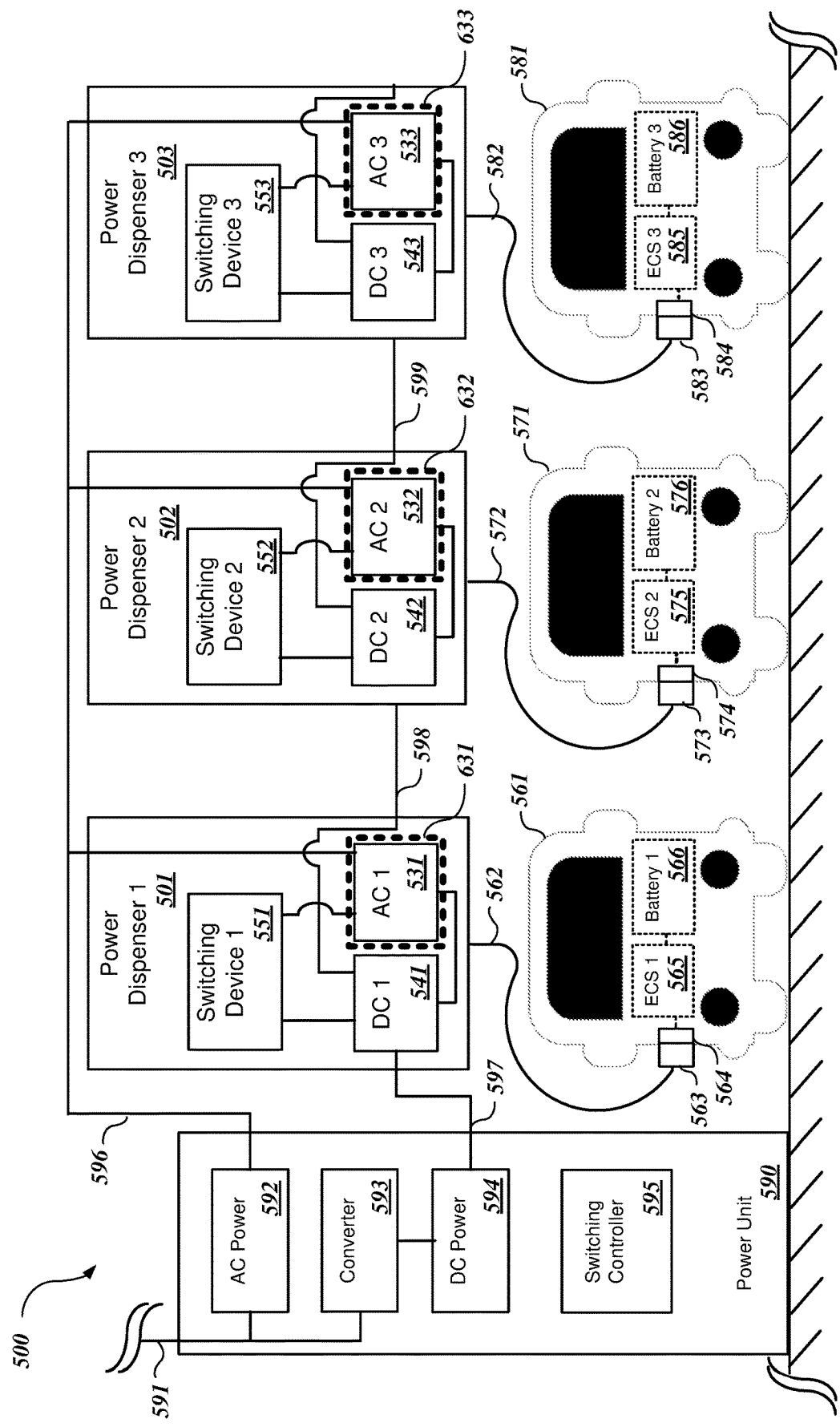

Referring to FIG. 6, in various embodiments, each of the AC power dispensers 531, 532, and/or 533 may receive AC power from the AC power source 592 at one time, as represented by the dashed boxes 631, 632, and 633, respectively. Thus, via the cables 562, 572, and 582 and couplers 563, 573, and 583, AC power may be provided to the electronic charging systems 565, 575, and 585 of each of the vehicles 561, 571, and 581, respectively. Thus, when the couplers 563, 573, and 583 are coupled to each of the power inputs 564, 574, and 584, each of the battery systems 566, 576, and 586, respectively, may be preconditioned for fast charging or charged with AC power. The switching controller 595 and the switching devices 551, 552, and 553 may determine which of the electronic charging systems 565, 575, and 585 receives AC power at the same time or at different times, as described further below. The level of AC power applied may be selected at a level that is suitable for preconditioning the battery. Also, when DC power is not available or is not desired, AC power may be provided to each of the vehicles 561, 571, and 581 to charge the battery systems 566, 576, and 586 using AC power.

Figure 7:
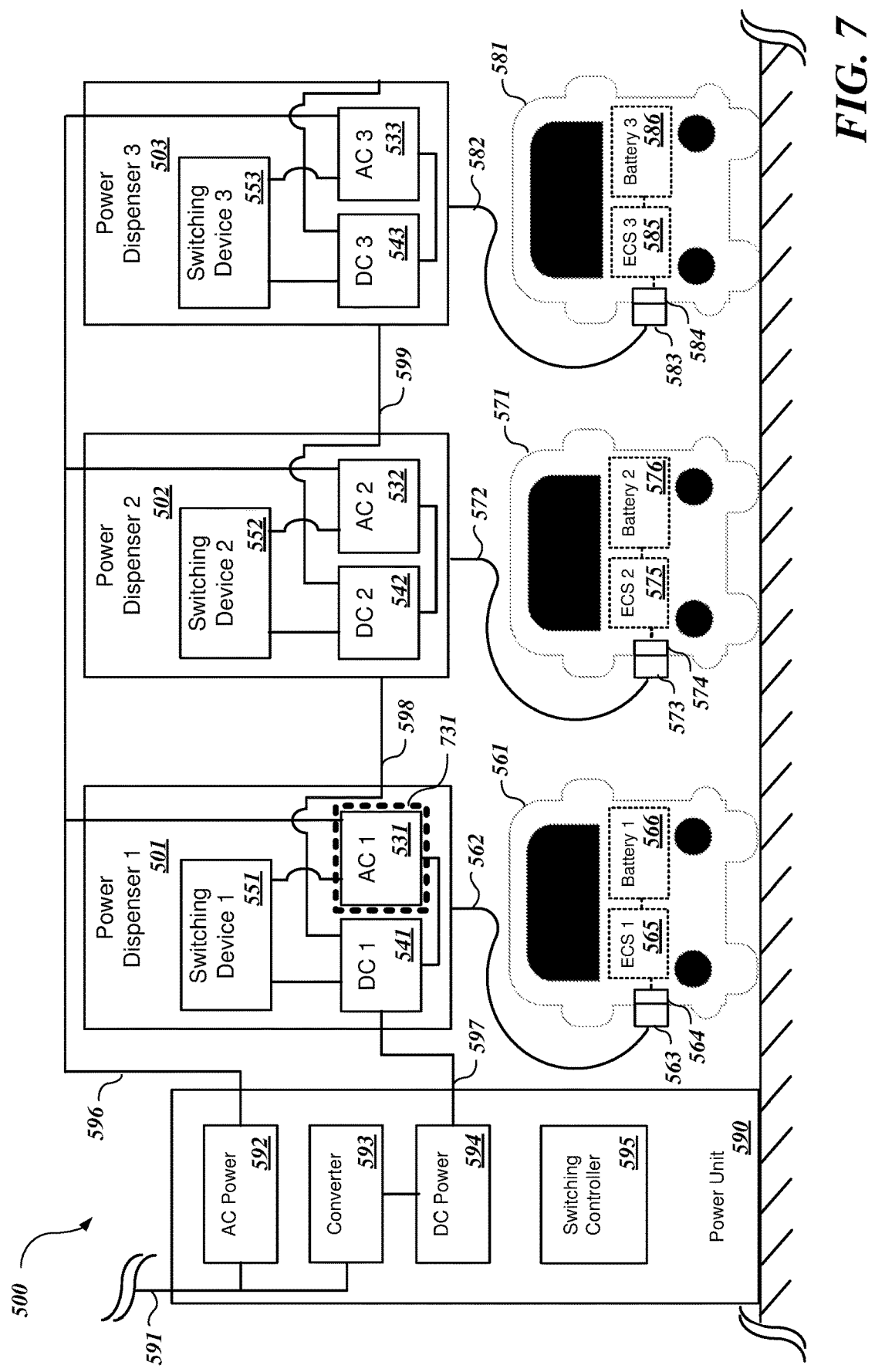

As described with reference to FIGS. 7-10, in various embodiments, each of the electronic charging systems 565, 575, and 585 may receive AC power for preconditioning of the battery systems 566, 576, and 586 followed by receiving DC power for fast charging of the battery systems 566, 576, and 586, respectively. Referring to FIG. 7, in various embodiments, AC power dispenser 1 531 of power dispenser 1 501 is activated (as represented by dashed box 731) to first precondition battery 1 566 of the first vehicle 561. The switching controller 595 and/or the switching devices 551, 552, and 553 may be configured to precondition the battery systems 566, 576, and 586 in any order, either based on a standard priority or based on a state of the battery systems 566, 576, and 586 that is detectable via signal lines 215 and/or 216 (FIG. 2) of the couplers 563, 573, and 583.

Figure 8:
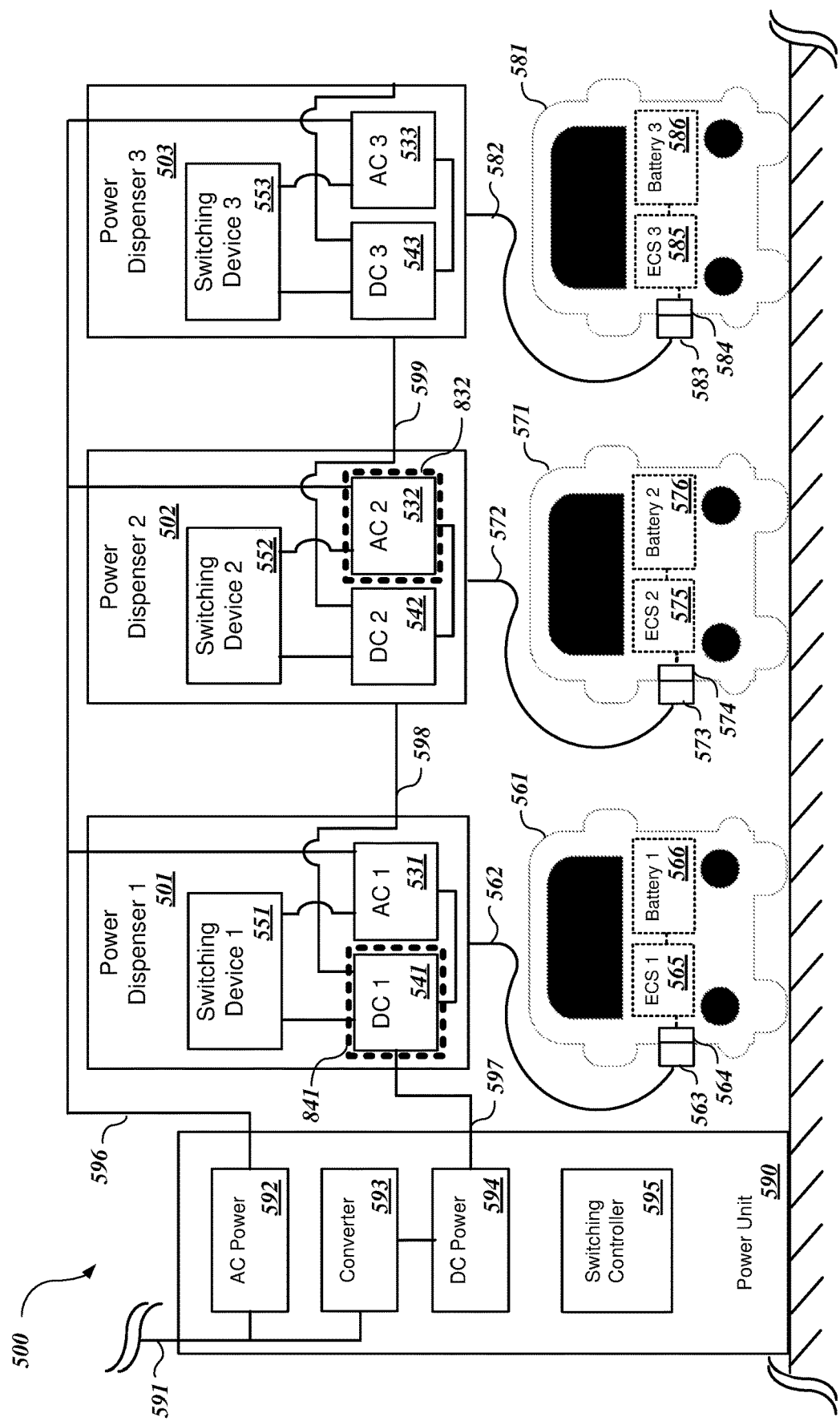

Referring additionally to FIG. 8, after battery 1 566 of the first vehicle 561 has been preconditioned for a desired interval with AC power provided to electronic charging system 1 565, AC dispenser 1 531 of power dispenser 1 501 is deactivated, such as by the switching controller 595 and/or switching device 1 551. The switching controller 595 and/or switching device 1 551 then activate DC dispenser 1 541 (as represented by dashed box 841) to provide DC power to the coupling 563. The DC power, in turn, is provided to electronic charging system 1 565 to facilitate fast charging or other DC charging of battery system 1 566. While DC power is provided to battery system 1 566 by power dispenser 1 501, AC power dispenser 2 532 of power dispenser 2 502 is activated (as represented by dashed box 832) to precondition battery system 2 576. As previously described with reference to FIG. 6, AC power may be provided to more than one of the electronic charging systems 565, 575, and 585 at a time. However, in order to fully direct available DC power from the DC power source 594 to facilitate fast charging of one of the vehicles 561, 571, and 581, the available DC power from the DC power source 594 is directed to only one of the DC power dispensers 541, 542, or 543. In various embodiments, the DC power dispensers 541, 542, or 543 are configured so that, when coupled in a daisy chain configuration, the DC power is available to only one of the DC power dispensers 541, 542, or 543 at one time.

Figure 9:
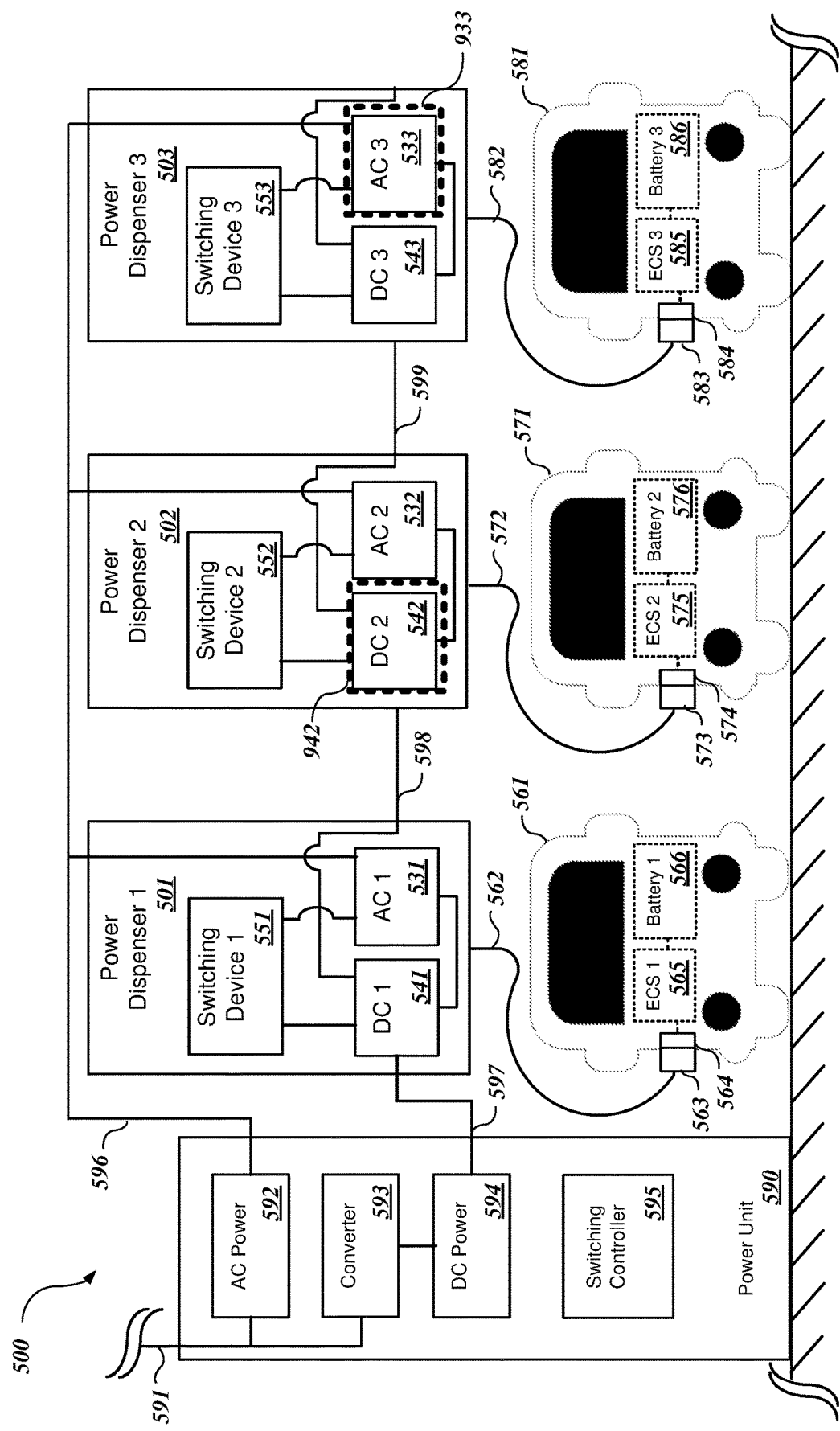

Referring additionally to FIG. 9, after battery system 2 576 of the second vehicle 571 has been preconditioned for a desired interval and/or battery system 1 566 of the first vehicle 561 has been charged to a desired level with DC power, the switching controller 595 and/or switching device 1 551 deactivate DC power dispenser 1 541. The switching controller 595 and/or the switching device 552 then activate DC power dispenser 2 542 (as represented by dashed box 942), respectively, to provide DC power to the coupling 573. The DC power provided to electronic charging system 2 575 thereby may facilitate fast charging or other DC charging of battery system 2 576. While DC power is provided to battery system 2 576 by power dispenser 2 502, AC power dispenser 3 533 of power dispenser 3 503 is activated (as represented by dashed box 933) to precondition battery system 3 586.

Figure 10:
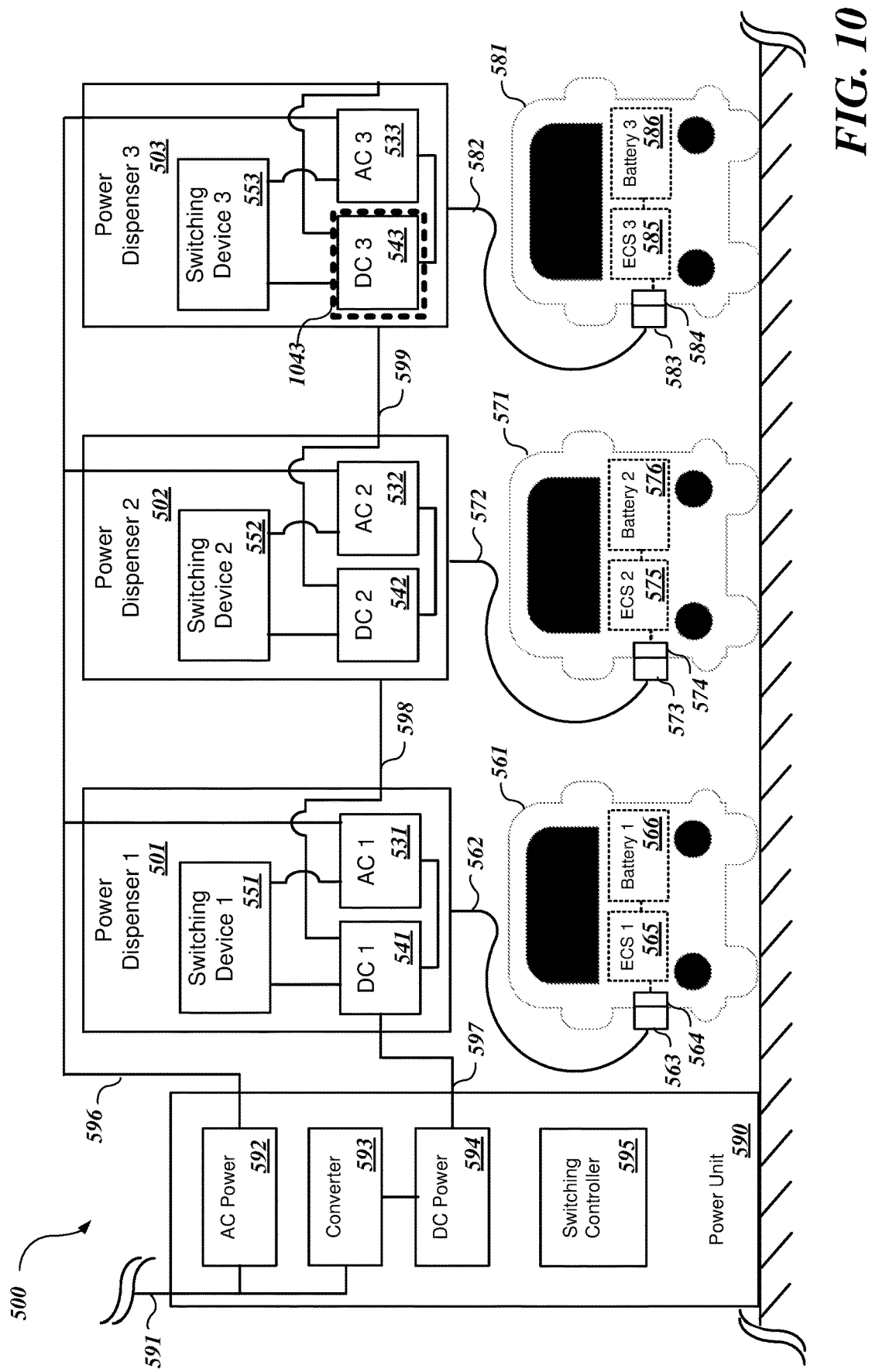

Referring additionally to FIG. 10, after battery system 3 586 of the third vehicle 581 has been preconditioned for a desired interval and/or battery system 1 566 of the second vehicle 571 has been charged to a desired level with DC power, the switching controller 595 and/or switching device 2 552 then deactivate DC dispenser 2 542. The switching controller 595 and/or switching device 3 553 then deactivate AC power dispenser 533 and activates DC power dispenser 3 543 (as represented by dashed box 1043) to provide DC power to the coupling 583. The DC power provided thus enables electronic charging system 3 585 to facilitate fast charging or other DC charging of battery system 3 586.

It will be appreciated that, by being able to selectively provide AC power and DC power to each of the electronic charging systems 565, 575, and 585, the battery systems 566, 576, and/or 586 may be preconditioned and charged with DC power using fast charging without switching couplers 563, 573, and 583, respectively. Thus, the condition of the battery systems 566, 576, and 586 may be preserved while enabling each of the battery systems 566, 576, and 586 to be fast-charged sequentially, thereby enabling available DC power to be directed to only one of the electronic charging systems 565, 575, and 585 at one time without manual intervention after the couplers 563, 573, and 583 are coupled to the power inputs 564, 574, and 584, respectively.

Figure 11:
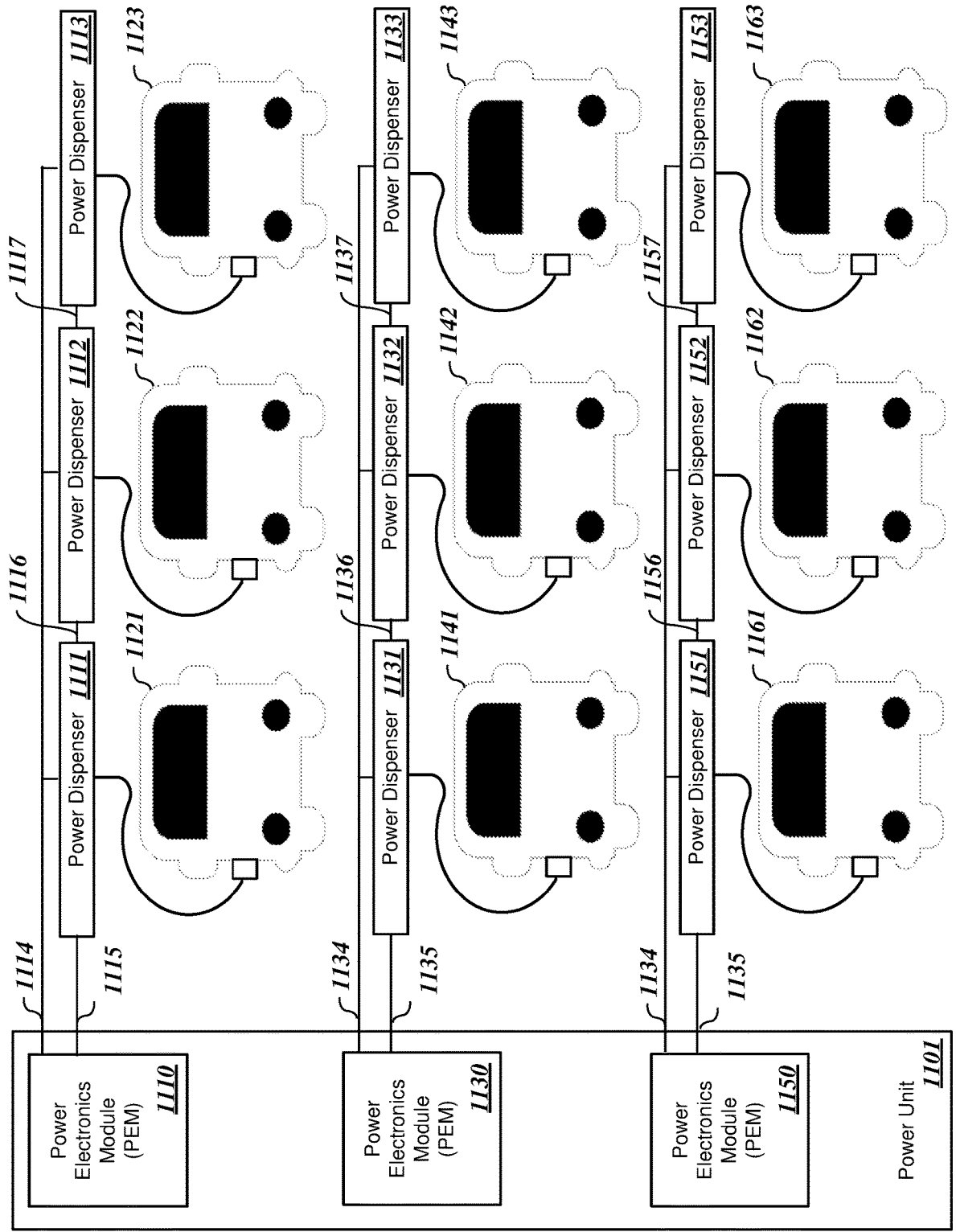

In various embodiments, the power unit may include multiple power electronics modules (PEMs) that each include additional AC and DC power sources. Each of the PEMs may provide power to its own set of power dispensers. Referring to FIG. 11, a power unit 1101, for example, includes three PEMs 1110, 1130, and 1150 that provide AC and DC power for a set of power dispensers. For example, PEM 1110 provides AC and DC power (as well as potentially providing switching control, as previously described with reference to FIGS. 3-10) for power dispensers 1111-1113 that may be used to charge vehicles 1121-1123. As in the previously described examples, an AC power source (not shown in FIG. 11) of PEM 1110 is coupled to each of the power dispensers 1111-1113 by an AC power line 1115. As also previously described, the power dispensers 1111-1113 are connected in a daisy chain to the DC power source (not shown in FIG. 11) of PEM 1110. In other words, the power dispenser 1111 is coupled directly to the DC power source of PEM 1110 by a DC power line 1115, while the power dispenser 1112 receives a DC power line 1116 from power dispenser 1111 and power dispenser 1113 receives a DC power line 1117 from power dispenser 1112. As previously described, this arrangement allows for switching of the DC power source of the PEM 1110 to be coupled to only one of the power dispensers 1111-1113.

Similarly, the PEM 1130 of the power unit 1101 may be coupled by an AC power line 1134 to the power dispensers 1131-1133 and coupled in a daisy chain arrangement of DC power lines 1135-1137 to the power dispensers 1131-1133 to provide AC and/or DC charging to the vehicles 1141-1143. Likewise, the PEM 1150 of the power unit 1101 may be coupled by an AC power line 1154 to the power dispensers 1151-1153 and coupled in a daisy chain arrangement of DC power lines 1155-1157 to the power dispensers 1151-1153 to provide AC and/or DC charging to the vehicles 1161-1163. Thus, one power unit 1101 may be coupled to multiples series of power dispensers to charge multiple sets of vehicles.

Figure 12:
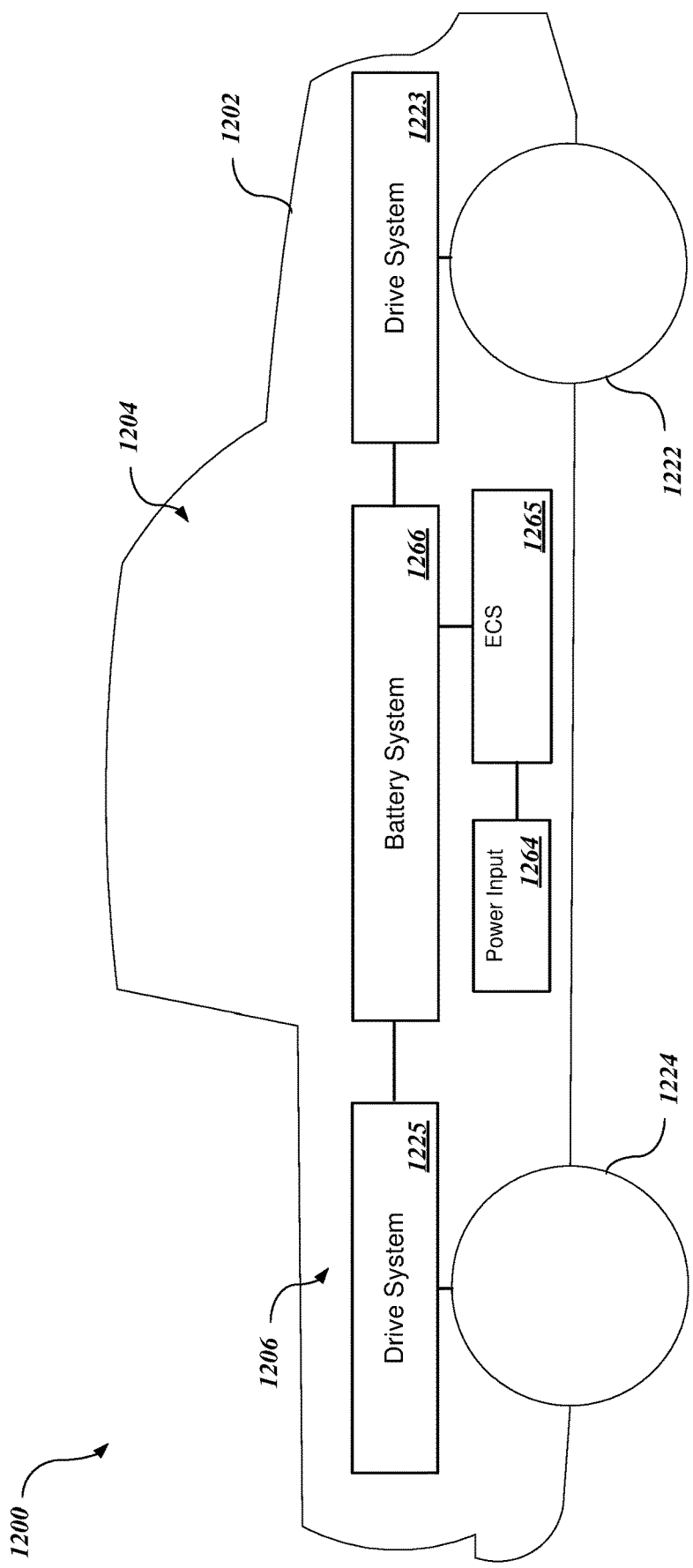
FIG. 12 is a block diagram of an illustrative electrically-powered vehicle usable with the apparatuses and systems of FIGS. 1-11.

Referring additionally to FIG. 12, in various embodiments, the couplers and power dispensers previously described with reference to FIGS. 1-11 may be used with multiple electrically-powered vehicles 1200. The vehicle 1210 may include a body 1202 that may include a cabin 1204 capable of accommodating an operator, one or more passengers, and/or cargo and a cargo area 1206 separate from the cabin 1204, such as a trunk or a truck bed, capable of transporting cargo. The system 100 may be accessible from the cabin 1204. The vehicle 1200 includes one or more drive systems 1223 and 1225 that are selectively engageable with one or more wheels 1222 and/or 1224 to motivate, accelerate, decelerate, stop, and steer the vehicle 1200. The one or more drive systems 1223 and 1225 draw power from a battery system 1266, such as described with reference to FIGS. 3-10. As also previously described, the vehicle includes an electric charging system 1265 that receives power via a power input 1264. In various embodiments, the power input 1264 receives a coupler (not shown in FIG. 12) that is configured to provide AC power and DC power to the power input 1264. In various embodiments, the electric charging system 1265 is configured to convert received AC power to DC power for charging the battery system 1266 or to directly apply received DC power to the battery system 1266 for charging.

While the vehicle 1200 has been illustrated as a motor vehicle for illustrative purposes only, given by way of non-limiting examples, in various embodiments the vehicle 1200 may be any electric vehicle (that is, an all-electrically driven vehicle) or a hybrid vehicle. For example and given by way of non-limiting examples, in various embodiments the vehicle may include a motor vehicle driven by wheels and/or tracks, such as, without limitation, an automobile, a truck, a sport utility vehicle (SUV), a van, an all-terrain vehicle (ATV), a motorcycle, an electric bicycle, a tractor, a lawn mower such as without limitation a riding lawn mower, a snowmobile, and the like. Given by way of further non-limiting examples, in various embodiments the vehicle ## may include a marine vessel such as, without limitation, a boat, a ship, a submarine, a submersible, an autonomous underwater vehicle (AUV), and the like. Given by way of further non-limiting examples, in various embodiments the vehicle ## may include an aircraft such as, without limitation, a fixed wing aircraft, a rotary wing aircraft, and a lighter-than-air (LTA) craft.

Figure 13:
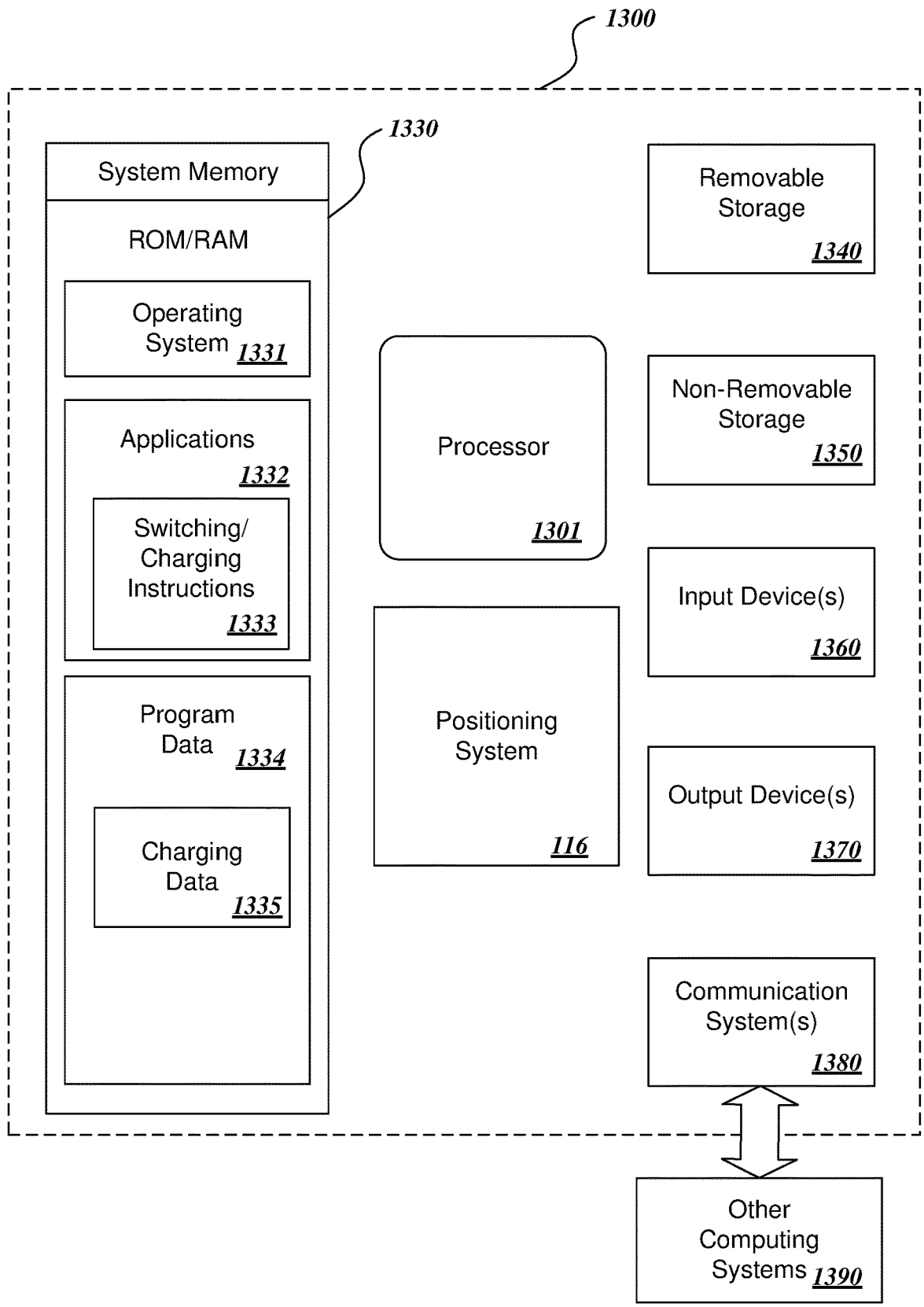
FIG. 13 is a block diagram of a general purpose computing system usable to control switching of AC and DC power to be provided to battery systems.

Referring additionally to FIG. 13, the switching controller 475 (FIG. 4) and 595 (FIGS. 5-10) and/or the switching devices 350 (FIG. 3) and 551-553 (FIGS. 5-10) may include a general purpose computing system 1300 configured to operate according to computer-executable instructions for logging positional coordinates and additional information. The computing system 1300 typically includes at least one processor 1301 and a system memory 1330. Depending on the configuration and type of computing system, the system memory 1330 may include volatile memory, such as random-access memory ("RAM"), non-volatile memory, such as read-only memory ("ROM"), flash memory, and the like, or a combination of volatile memory and non-volatile memory. The system memory 1330 typically maintains an operating system 1331, one or more applications 1332, and program data 1334. The operating system 1331 may include any number of operating systems executable on desktop or portable devices including, but not limited to, Linux, Microsoft Windows®, Apple iOS®, or Android®, or a proprietary operating system. The applications 1332 may include the switching and charging instructions 1333. The program data 1334 may include charging data 1335 that specifies desired charging levels, sequences in which coupled systems are to be charged, battery condition information, and other data.

The computing system 1300 may also have additional features or functionality. For example, the computing system 1300 may also include additional data storage devices (removable and/or non-removable) such as, for example, magnetic disks, optical disks, tape, or flash memory. Such additional storage devices are illustrated in FIG. 13 by removable storage 1340 and non-removable storage 1350. Computer storage media may include volatile and non-volatile, removable and non-removable media implemented in any method or technology for storage of information, such as computer-readable instructions, data structures, program modules or other data. The system memory 1330, the removable storage 1340, and the non-removable storage 1350 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing system 1300. Any such computer storage media may be part of the computing system 1300.

The computing system 1300 may also have input device(s) 1360 such as a keyboard, stylus, voice input device, touchscreen input device, etc. Output device(s) 1370 such as a display, speakers, short-range transceivers such as a Bluetooth transceiver, etc., may also be included. The computing system 1300 also may include one or more communication systems 1380 that allow the computing system 1300 to communicate with the Wide Area Network 250 (FIG. 2) other computing systems 1390, such as between the switching controller and/or the switching devices. The communication system 1380 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communications media may include wired media such as a wired network or direct-wired connection, and wireless media such as acoustic, radio frequency (RF), infrared and other wireless media. The term computer-readable media as used herein includes both storage media and communication media.

Figure 14:
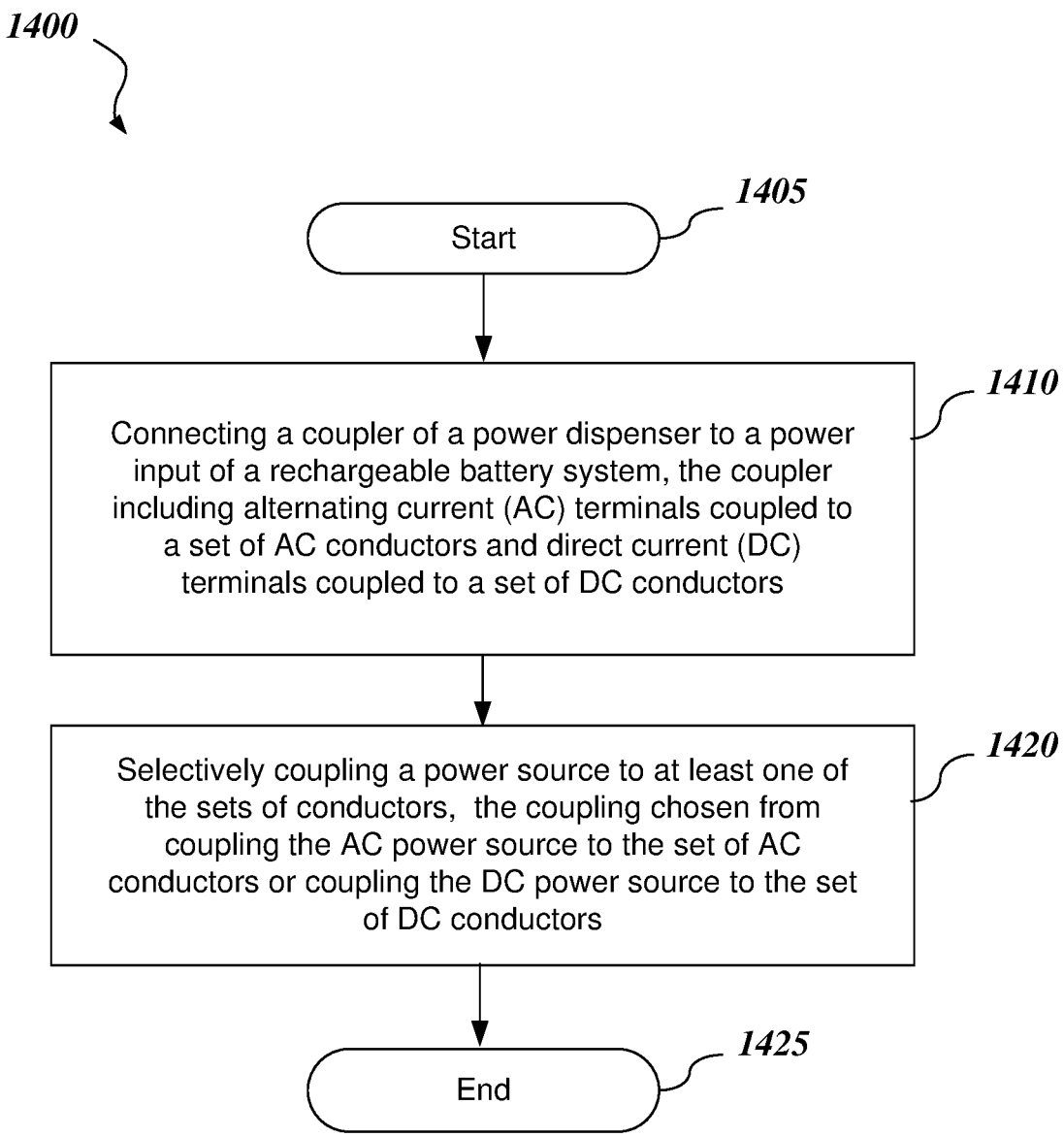
FIG. 14 is a flow chart of an illustrative method to provide both AC and DC power for charging battery systems.

Referring to FIG. 14, an illustrative method 1400 is provided to switchably provide electric power to a battery system and an external system, from a single charging system or other source of electric power. The method 1400 starts at a block 1405. At a block 1410, a coupler of a power dispenser is connected to a power input of a rechargeable battery system, the coupler including alternating current (AC) terminals coupled to a set of AC conductors and direct current (DC) terminals coupled to a set of DC conductors. At a block 1420, a power source is selectively coupled to at least one of the sets of conductors, the coupling chosen from coupling the AC power source to the set of AC conductors or coupling the DC power source to the set of DC conductors. The method ends at a block 1425.

In various embodiments of an illustrative method, the coupler is connectable to a power input electrically connectable to a rechargeable battery system. In various embodiments, the coupler includes a Combined Charging System (CCS) and the power input includes a CCS input. In various embodiments, one of the two sets set of conductors is coupled to a power source chosen from coupling the AC power source to the AC conductors and coupling the DC conductors to the DC power source. In various embodiments, one of the two sets of conductors is coupled in a sequence including coupling the AC power source to the AC conductors, decoupling the AC power source from the AC conductors, and coupling the DC conductors to the DC power source. In various embodiments, a level of AC power provided by the AC power source is selected to precondition the battery system before the DC power source is coupled to the battery system. In various embodiments, the coupler includes one of a plurality of couplers. In various embodiments, the AC conductors of at least one of the plurality of couplers are coupled to the AC power source when the DC conductors of another of the plurality of couplers is coupled to the DC power source. In various embodiments, the AC power source is coupled to the AC conductors to charge the rechargeable battery system when the DC power source is unavailable Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. An apparatus comprising:
   a first power dispenser to couple, via a first coupler, with a first power input of a first rechargeable battery system, wherein the first coupler includes:
      a body;
      alternating current (AC) terminals disposed within the body and configured to electrically engage AC input terminals of the first power input;
      direct current (DC) terminals disposed within the body and configured to electrically engage DC input terminals of the first power input;
      a cable coupled to the body of the first coupler that includes a first set of AC conductors coupled to the AC terminals and a separate first set of DC conductors coupled to the DC terminals, wherein the first set of AC conductors is configured to be selectively coupled with an AC power source disposed at an end of the cable opposite the body of the coupler and the first set of DC conductors is configured to be selectively coupled with a DC power source disposed at an end of the cable opposite the body of the coupler;
   a second power dispenser to couple, via a second coupler, with a second power input of a second rechargeable battery system, wherein the second coupler includes:
      a second set of AC conductors to couple with the AC power source; and
      a separate second set of DC conductors to couple with the DC power source; and a controller to:
  select, based on a condition of the first rechargeable battery system or the second rechargeable battery system, one of the first power dispenser or the second power dispenser; and
  generate a control signal to couple the DC power source with the selected one of the first power dispenser or the second power dispenser.

2. The apparatus of claim 1, further comprising the controller to:
  select, based on the condition of the first rechargeable battery system or the second rechargeable battery system, a second one of the first power dispenser or the second power dispenser; and
  generate, responsive to the selection of the second one of the first power dispenser or the second power dispenser, control signals to couple the AC power source with the second one of the first power dispenser or the second power dispenser.

3. The apparatus of claim 1, comprising the controller to:
  generate control signals to couple the set of AC conductors with the AC power source to precondition the rechargeable battery system for charging, based on the condition of the first rechargeable battery system or the second rechargeable battery system;
  determine the battery is preconditioned;
  generate control signals to decouple the set of AC conductors from the AC power source based on the determination that the battery is preconditioned; and
  generate control signals to couple the set of DC conductors to the DC power source to charge the rechargeable battery system based on the determination that the battery is preconditioned.

4. The apparatus of claim 2, comprising the controller to:
  determine an unavailability of the DC power source; and
  generate control signals to couple the set of AC conductors to the AC power source to charge the rechargeable battery system response to the determined unavailability.

5. The apparatus of claim 1, wherein the first coupler is a Combined Charging System coupler.

6. A system comprising:
  a first power dispenser to couple, via a first coupler, with a first power input of a first rechargeable battery system, wherein the first coupler includes:
    a first alternating current (AC) power dispenser electrically couplable to an AC power source and configured to selectively couple the AC power source to a first rechargeable battery system; and
    a first direct current (DC) power dispenser electrically couplable to a DC power source and configured to selectively couple the DC power source to the first rechargeable battery system;
  a first coupler receivable by the first power input, wherein the coupler includes:
    a body;
    AC terminals disposed within the body and configured to electrically engage AC input terminals of the first power input;
    DC terminals disposed within the body and configured to electrically engage DC input terminals of the first power input; and
    a cable coupled between an output of first dispenser and the body of the first coupler that includes a first set of AC conductors coupled to the AC terminals and a separate first set of DC conductors coupled to the DC terminals, wherein the first set of AC conductors is configured to be selectively coupled with the AC power source and the set of DC conductors is configured to be selectively with the DC power source;
  a second power dispenser to couple, via a second coupler, with a second power input of a second rechargeable battery system, wherein the second coupler includes:
    a second set of AC conductors to couple with the AC power source; and
    a separate second set of DC conductors to couple with the DC power source; and
  a controller to:
    determine a condition of the first rechargeable battery system or the second rechargeable battery system;
    select, based on the condition, one of the first power dispenser or the second power dispenser; and
    generate a control signal to couple the DC power source with the selected one of the first power dispenser or the second power dispenser.

7. The system of claim 6, wherein:
  a maximum rate of charge provided by the DC power source exceed a maximum rate of charge provided by the AC power source; and
  the condition of the first rechargeable battery system or the second rechargeable battery system comprises:
    a state of charge of the first rechargeable battery system; and
    a state of charge of the second rechargeable battery system.

8. The system of claim 6, comprising the controller to:
  generate control signals to couple the AC power source to the rechargeable battery system via the coupler to precondition the first rechargeable battery system based on the condition of the first rechargeable battery system or the second rechargeable battery system; and
  based on a determination that the battery is preconditioned, generate control signals to:
    decouple the AC power source from the first rechargeable battery system; and
    couple the DC power source to the coupler to charge the first rechargeable battery system.

9. The system of claim 6, wherein:
  a quantity of power dispensers exceeds a quantity of DC power sources.

10. The system of claim 6, wherein:
  a quantity of power dispensers exceeds a quantity of AC power sources.

11. The system of claim 6, wherein the first coupler is a Combined Charging System coupler.

12. A method comprising:
  detecting a connection between a first coupler coupled to a first power dispenser by a first cable disposed between the coupler and an output of the first power dispenser to a power input of a first rechargeable battery system, a body of the first coupler including first alternating current (AC) terminals coupled to a set of first AC conductors disposed within the cable and first direct current (DC) terminals coupled to a separate first set of DC conductors disposed within the first cable;
  detecting a connection between a second coupler coupled to a second power dispenser by a second cable disposed between the coupler and an output of the second power dispenser to a power input of a second rechargeable battery system, a body of the second coupler including second alternating current (AC) terminals coupled to a set of second AC conductors disposed within the cable and second direct current (DC) terminals coupled to a separate second set of DC conductors disposed within the second cable;

determining a condition of the first rechargeable battery system or the second rechargeable battery system;

selecting, based on the condition, the first power dispenser; and coupling, responsive to the selection, a DC power source with the first power dispenser.

13. The method of claim 12, further comprising:

coupling, based on the condition, an AC power source with the second power dispenser.

14. The method of claim 12, wherein the system does not comprise a second DC power source couplable with the first coupler or the second coupler.

15. The method of claim 12, further comprising: determining a condition of the DC power source or the first power dispenser; and coupling, responsive to the determination of the condition of the DC power source or the first power dispenser, an AC power source with the first power dispenser.

16. The method of claim 12, further:

determining that the first rechargeable battery system is preconditioned;

decoupling, based on the determination, the AC power source from the set of AC conductors; and coupling, based on the determination, the DC power source to the set of DC conductors.

17. The method of claim 16, further comprising selecting a level of AC power provided by the AC power source to precondition the first rechargeable battery system before the DC power source is coupled to the battery system.

18. The method of claim 16, wherein the first coupler is a Combined Charging System (CCS) coupler and power input includes a CCS input.

19. The method of claim 18, further comprising coupling the second rechargeable battery system with the AC power source when the first rechargeable battery system is coupled with the DC power source.

20. The method of claim 15, wherein the condition of the DC power source or the first power dispenser comprises an unavailability of DC power for delivery to the first rechargeable battery system.

* * * * *